US011250330B2

(12) United States Patent
Margolin et al.

(10) Patent No.: US 11,250,330 B2
(45) Date of Patent: Feb. 15, 2022

(54) COUNTRY IDENTIFICATION USING UNSUPERVISED MACHINE LEARNING ON NAMES

(71) Applicant: PayPal, Inc., San Jose, CA (US)

(72) Inventors: Itay Margolin, Tel Aviv (IL); Shafik Bisharat, Tel Aviv (IL)

(73) Assignee: PayPal, Inc., San Jose, CA (US)

(*) Notice: Subject to any disclaimer, the term of this patent is extended or adjusted under 35 U.S.C. 154(b) by 229 days.

(21) Appl. No.: 16/440,954

(22) Filed: Jun. 13, 2019

(65) Prior Publication Data

US 2020/0394525 A1 Dec. 17, 2020

(51) Int. Cl.
*G06N 3/08* (2006.01)
*G06F 40/253* (2020.01)
*G06F 40/295* (2020.01)

(52) U.S. Cl.
CPC ........... *G06N 3/088* (2013.01); *G06F 40/253* (2020.01); *G06F 40/295* (2020.01)

(58) Field of Classification Search
None
See application file for complete search history.

(56) References Cited

U.S. PATENT DOCUMENTS

| | | | |
|---|---|---|---|
| 2005/0071417 A1 | 3/2005 | Taylor et al. | |
| 2007/0005578 A1* | 1/2007 | Patman | G06F 40/295 |
| 2008/0177739 A1* | 7/2008 | Kolo | G06F 40/295 |
| 2011/0143753 A1 | 6/2011 | Rahman et al. | |
| 2011/0166977 A1 | 7/2011 | Krein et al. | |
| 2014/0330765 A1 | 11/2014 | Prieditis | |
| 2016/0174046 A1 | 6/2016 | Wilden et al. | |
| 2016/0239857 A1 | 8/2016 | Milton et al. | |
| 2017/0177584 A1* | 6/2017 | Narasimha | H04N 21/235 |
| 2017/0353477 A1 | 12/2017 | Faigon et al. | |
| 2018/0068330 A1 | 3/2018 | Gupta et al. | |

(Continued)

OTHER PUBLICATIONS

Balakrishnan, Raju. "Country Wise Classification of Human Names." In Proceedings of the 5th WSEAS Int. Conf. on Artificial Intelligence, Knowledge Engineering and Data Bases, Madrid, pp. 411-416. 2006. (Year: 2006).*

(Continued)

*Primary Examiner* — Frank D Mills
(74) *Attorney, Agent, or Firm* — Haynes and Boone, LLP (57) ABSTRACT

Techniques are described relating to identifying a country (or other item) associated with an individual based on the individual's name. These techniques rely on machine learning and artificial intelligence adaptions, according to various embodiments, and allow for better identification of country than some alternative techniques. Specifically, unsupervised machine learning techniques (e.g. using a word2vec based algorithm) allow for the handling of noisy data, which can be a significant difficulty in attempting to associate a person's name to a particular country, where it may be quite difficult or even impossible to train a supervised machine learning model that can effectively make decisions on how to associate an unknown person to a particular country. Accordingly, this disclosure includes techniques related to unsupervised machine learning that are particularly helpful for solving this problem, including using a training data set that is prepared by adding country codes (or another identifier) to names.

20 Claims, 7 Drawing Sheets

(56) References Cited

U.S. PATENT DOCUMENTS

2018/0218382 A1* 8/2018 Ye ..................... G06Q 30/0204
2018/0300668 A1 10/2018 Farley et al.
2019/0013011 A1 1/2019 Huang
2019/0102374 A1* 4/2019 Tiwari .................. G06Q 50/01
2020/0278986 A1* 9/2020 Guha ................... G06F 16/285

OTHER PUBLICATIONS

Mubarak, Hamdy, and Kareem Darwish. "Classifying Arab Names Geographically." In Proceedings of the Second Workshop on Arabic Natural Language Processing, pp. 1-8. 2015. (Year: 2015).*

* cited by examiner

FIG. 1

Raw Data 205

| First Name | Last Name | Country Code |
|---|---|---|
| Itay | Margolin | IL |
| Shafik | Bisharat | IL |
| Maria | Fernandez | MX |
| Rachel | Green | US |
| Huan | Alfero | ES |

Row 210
Row 212
Row 214
Row 216
Row 218

| Training Data Set 255 | |
|---|---|
| Name and Country Code String | |
| Itay Margolin IL | ← Row 260 |
| Shafik Bisharat IL | ← Row 262 |
| Maria Fernandez MX | ← Row 264 |
| Rachel Green US | ← Row 266 |
| Huan Alfaro ES | ← Row 268 |

COUNTRY IDENTIFICATION USING UNSUPERVISED MACHINE LEARNING ON NAMES

TECHNICAL FIELD

This disclosure relates to improvements in machine learning and artificial intelligence technology, and more particularly to improvements in unsupervised learning usable to identify a country (or other region) associated with a name, in various embodiments.

BACKGROUND

In various contexts, it may be desirable to know what country a person is associated with. This may be a country where the person was born, for example, or a country where the person has immediately family members living (e.g., father, mother, spouse, child).

It can be challenging to identify a country with which a person is associated, however, when there may not be much information about the person. In particular, it can be very difficult to identify a country using only a person's name (and/or additional information). Applicant recognizes that the ability to associate a country with an individual can be improved with target use of machine learning and artificial intelligence, however, as discussed further below.

DETAILED DESCRIPTION

Techniques are described relating to identifying a country associated with an individual based on the individual's name. These techniques rely on particular adaptations within the field of machine learning and artificial intelligence, according to various embodiments, and allow for a better identification of country than some alternative techniques.

Various reasons may exist to associate a particular country (or other region) with a particular person. In the case of international money transfers, for example, knowing that an individual is associated with a particular country (e.g. an immigrant to the U.S.A. has family remaining in India) may help facilitate usage of a transfer service such as that provided by Xoom™. More generally, content personalization of many different types can be performed based on a person-to-country association.

Noisy data can be a significant difficulty in attempting to associate a person's name to a particular country. There may be individuals named Juan Martinez that are variously associated with the United States, with Mexico, with Spain, and with Costa Rica, for example. Without significant additional data, it may be quite difficult or even impossible to train a supervised machine learning model that can effectively make a decision on how to associate an unknown person to a particular country.

Accordingly, this disclosure includes techniques related to unsupervised machine learning that are particularly helpful for solving this problem, according to various embodiments. Noisy data, such as names, can be turned into an unsupervised machine learning training data set that allows names and name portions to be associated with particular countries (or another item). A word2vec based classifier can then be trained and utilized in such a way as to allow an unknown subject to be associated with a particular country where other supervised machine learning techniques would fail or underperform.

This specification discusses an association between a "country" and a person, in many examples and embodiments. Note that the present techniques can be generalized and used in other contexts, however. An association between a geographic region (state, sub-continent, metropolitan city area, etc.) and a person can thus be determined using machine learning techniques. Even more generally, an association between a person's name and various other data can be identified using these techniques—especially when there is a noisy data set that makes using supervised machine learning difficult or impossible.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
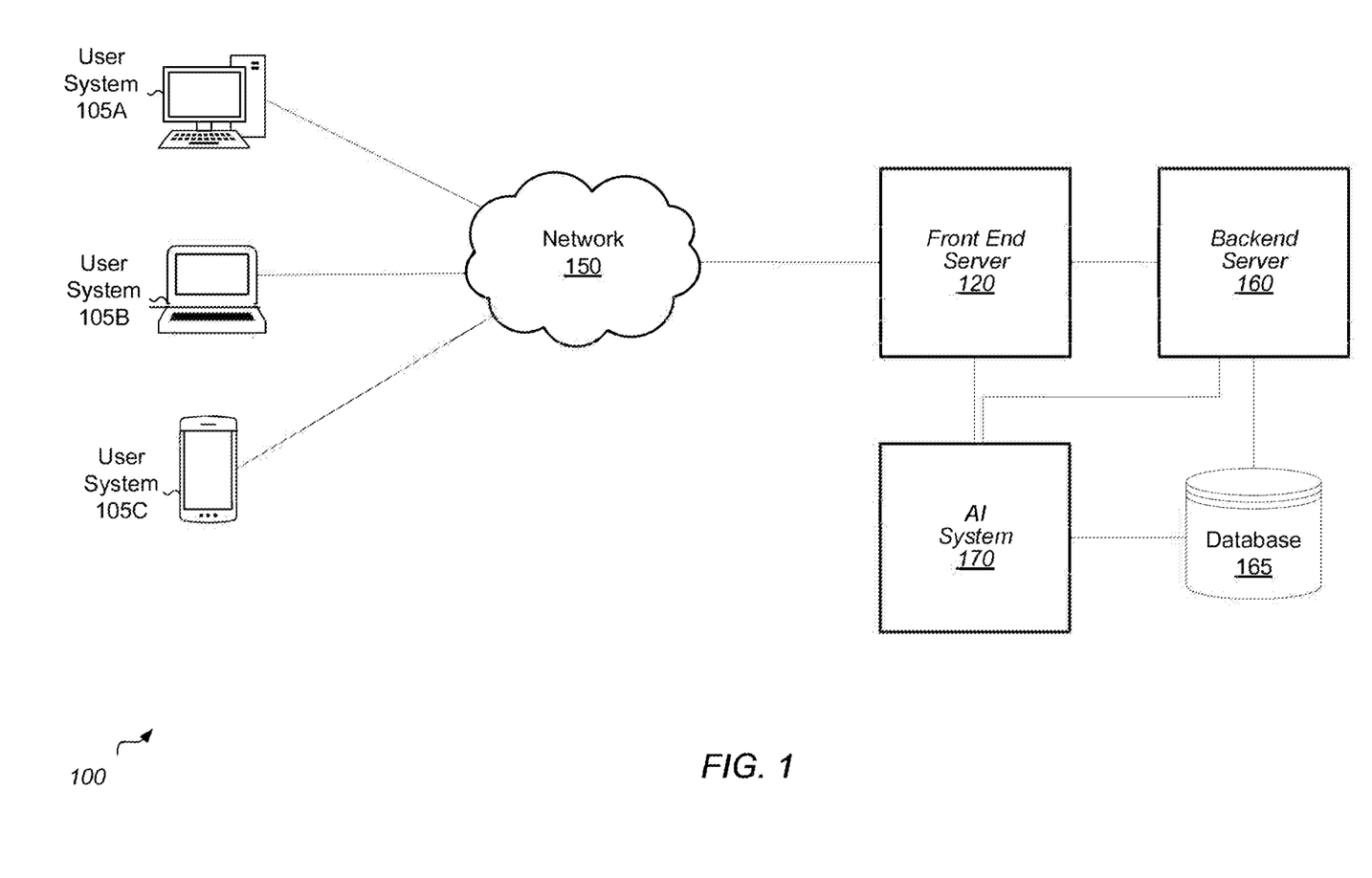
FIG. 1 illustrates a block diagram of a system including user systems, a front end server, backend server, AI system, and database, according to some embodiments.

Turning to FIG. 1, a block diagram of a system 100 is shown, according to various embodiments. In this diagram, system 100 includes user systems 105A, 105B, and 105C. System 100 also includes front end server 120, backend server 160, database 165, AI system 170 (artificial intelligence system 170), and network 150. The techniques described herein can be utilized in the environment of system 100, as well as numerous other types of environment.

Note that many other permutations of FIG. 1 are contemplated (as with all figures). While certain connections are shown (e.g. data link connections) between different components, in various embodiments, additional connections and/or components may exist that are not depicted. As will be appreciated by one of skill in the art, various devices may be omitted from this diagram for simplicity—thus, in various embodiments, routers, switches, load balancers, computing clusters, additional databases, servers, and firewalls, etc., may all be present and utilized. Components may be combined with one other and/or separated into one or more systems in this figure, as in other figures.

User systems 105A, 105B, and 105C ("user systems 105") may be any user computer system that can potentially interact with front end server 120, according to various embodiments. Front end server 120 may send communications to users, such as emails, text messages, etc. These communications may contain personalized content created based on an association of a particular country with a particular person, in some embodiments.

Front end server 120 may also provide web pages that facilitate one or more services, such as account access and electronic payment transactions (as may be provided by Xoom.com™ or PayPal.com™). Front end server 120 may thus facilitate access to various electronic resources, which can include an account, data, and various software programs/functionality, etc. A user of user system 105A may receive communications from front end server 120. A user may receive an email, text message, or other communication containing various content, for example, some of which can be based on a country with which the user is associated (e.g., a country the user emigrated from, a country the user has family in, a country with which the user has business ties, etc.).

Front end server 120 may be any computer system configured to provide access to electronic resources. This can include providing communications to users and/or web content, in various embodiments, as well as access to functionality provided a web client (or via other protocols, including but not limited to SSH, FTP, database and/or API connections, etc.). Services provided may include serving web pages (e.g. in response to a HTTP request) and/or providing an interface to functionality provided by backend server 160 and/or database 165. Database 165 may include various data, such as user account data, system data, and any other information. Multiple such databases may exist, of course, in various embodiments, and can be spread across one or more data centers, cloud computing services, etc. Front end server 120 may comprise one or more computing devices each having a processor and a memory. Network 150 may comprise all or a portion of the Internet.

Front end server 120 may correspond to an electronic payment transaction service such as that provided by Xoom™ or PayPal™ in some embodiments, though in other embodiments, front end server 120 may correspond to different services and functionality. Front end server 120 and/or backend server 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via front end server 120 and/or backend server 160, including but not limited to stocks, commodities, gift cards, incentive points (e.g. from airlines or hotels), etc. Server system 120 may also correspond to a system providing functionalities such as API access, a file server, or another type of service with user accounts in some embodiments (and such services can also be provided via front end server 120 in various embodiments).

Database 165 can include a transaction database having records related to various transactions taken by users of a transaction system in the embodiment shown. These records can include any number of details, such as any information related to a transaction or to an action taken by a user on a web page or an application installed on a computing device (e.g., the Xoom or PayPal app on a smartphone). Many or all of the records in database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details. Such information may be used for bookkeeping purposes as well as for risk assessment (e.g. fraud and risk determinations can be made using historical data; such determinations may be made using systems and risk models not depicted in FIG. 1 for purposes of simplicity). As will be appreciated, there may be more than simply one database in system 100. Additional databases can include many types of different data beyond transactional data. Any description herein relative to database 165 may thus be applied to other (non-pictured) databases as well.

Backend server 160 may be one or more computing devices each having a memory and processor that enable a variety of services. Backend server 160 may be deployed in various configurations. In some instances, all or a portion of the functionality for web services that is enabled by backend server 160 is accessible only via front end server 120 (e.g. some of the functionality provided by backend server 160 may not be publicly accessible via the Internet unless a user goes through front end server 120 or some other type of gateway system). Backend server 160 may perform operations such as risk assessment, checking funds availability, among other operations.

AI system 170 likewise may be one or more computing devices each having a memory and processor. In various embodiments, AI system 170 performs operations related to identifying a country with which a user is associated. AI system 170 may transmit information to and/or receive information from a number of systems, including database 165, front end server 120, and back end server 160, as well as other systems, in various embodiments. (Note that AI system 170 may of course also be a server system and no special meaning should be given to the names used to describe the components of FIG. 1).

Figure 2A:
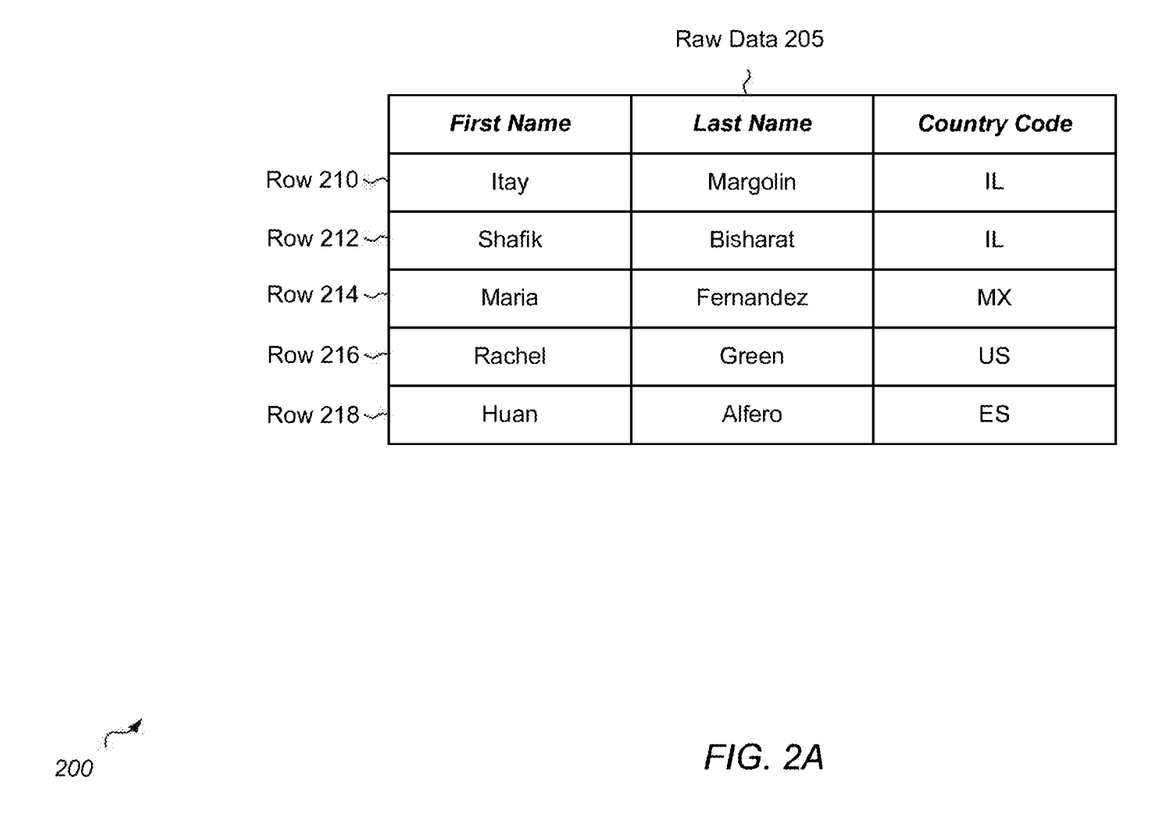
FIG. 2A illustrates a diagram relating to a representation of raw data that is usable to build a machine learning system that can identify a country based on an individual's name, according to some embodiments.

Turning to FIG. 2A, a diagram 200 is shown of one representation of raw data 205 that is usable to build a machine learning system that can identify a country based on an individual's name, according to some embodiments. Concepts introduced relative to this diagram (as well as FIGS. 2B, 3A, and 3B) will be explained in further detail relative to other diagrams further below.

In FIG. 2A, raw data 205 includes several different individual names as well as a country code (country identifier) with which those individuals are associated. Thus, row 210 indicates that "Itay Margolin" is associated with Israel (IL). Row 212 shows that Shafik Bisharat is associated with Israel. Row 214 shows that Maria Fernandez is associated with Mexico (MX). Row 216 shows that Rachel Green is associated with the United States (US), while row 218 shows that Huan Alfero is associated with Spain (ES). In this raw data, the association of an individual to a particular country is already known (or presumed). However, the subsequent results of processing this raw data to create a machine learning system will enable the association of a particular individual to one or more particular countries, even if that particular individual is not already known to be associated with those one or more countries.

Note that each of the columns shown (First Name, Last Name, Country Code) may be maintained in database 165 as separate data fields. These data might thus be separately accessed using database operations like SQL queries. Other data may also be present, such as email, address, etc. Additional name specific data can also be present—for example, raw data 205 can have additional components such as Middle Name (a third name field), or further name fields as desired, in various embodiments.

Raw data set 205 can be manipulated to create training data set 255, as will be explained below. This training data set can then be used as part of a machine learning system for associating a country (or other region) with a person based on that person's name. Examples for FIGS. 2A, 2B, 3A, and 3C are given with respect to only two names (first name, last name) for ease of explanation, but it should be understood that the present techniques can be used in other configurations as well (e.g. three name fields, four name fields, etc.)

Figure 2B:
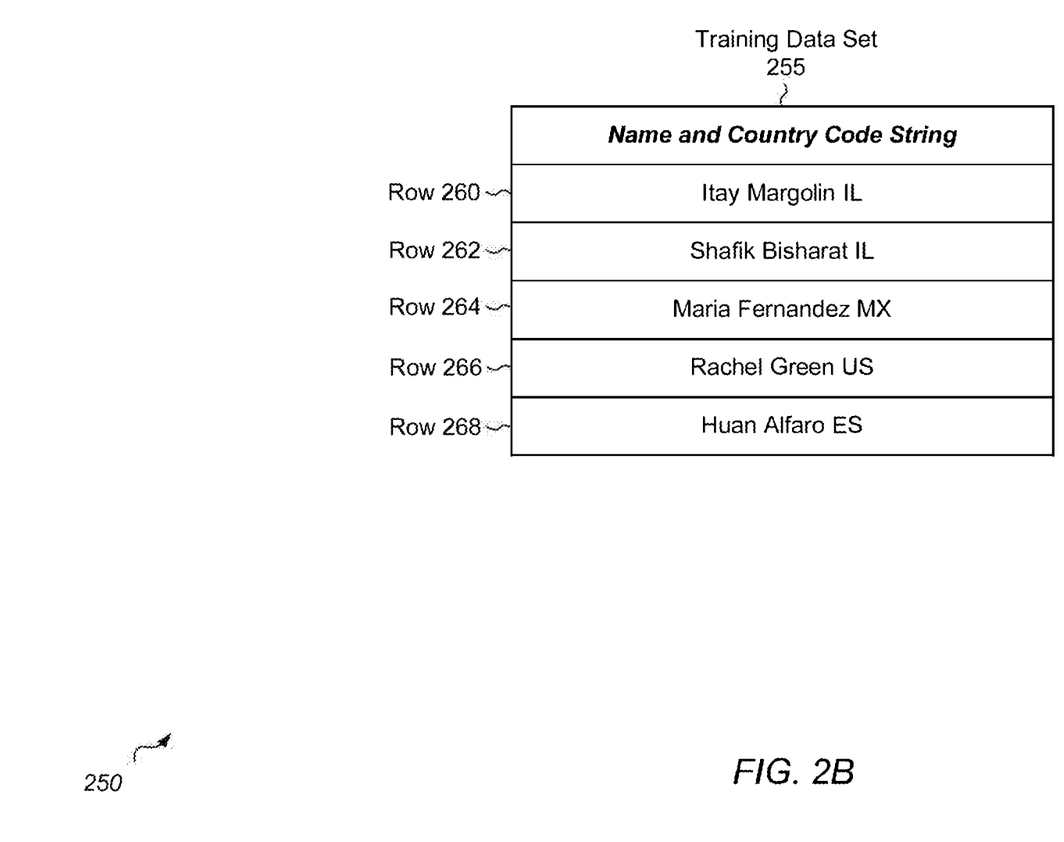
FIG. 2B illustrates a further diagram relating to a representation of a training data set that is usable in building a machine learning classifier that can identify a country based on an individual's name, according to some embodiments.

Turning to FIG. 2B, a diagram 250 is shown of one representation of a training data set 255 that is usable in building a machine learning classifier that can identify a country based on an individual's name, according to some embodiments.

Training data set 255 is created by appending a country code to the name information from raw data set 205, in this example. Thus, the single entry shown in row 260 is created by taking the first name "Itay" from row 210 of raw data 205, appending the last name "Margolin" from row 210, and further appending the country code "IL". The resulting value is a single string "Itay Margolin IL". The additional strings shown in rows 262, 264, 266, and 268 can then be used to create a vector feature space (e.g. using a Word2Vec algorithm) that will operate as part of a machine learning classifier. More generally, this training data set allows associations to be created between particular names (or name portions) and particular countries. The name portions "Itay", "Margolin", "Shafik", and "Bisharat" can be associated with Israel in the machine learning system. Likewise, the name portions "Huan" and "Alfero" can be associated with Spain.

There are many, many more different names that can be used as part of raw data 205 and training data set 255, of course. For ease of explanation only a few names are shown in FIGS. 2A and 2B. But in other embodiments, dozens, hundreds, thousands, millions (or an even larger number) of names can be used to train a machine learning classifier that is capable of associating a country with an individual.

Figure 3A:
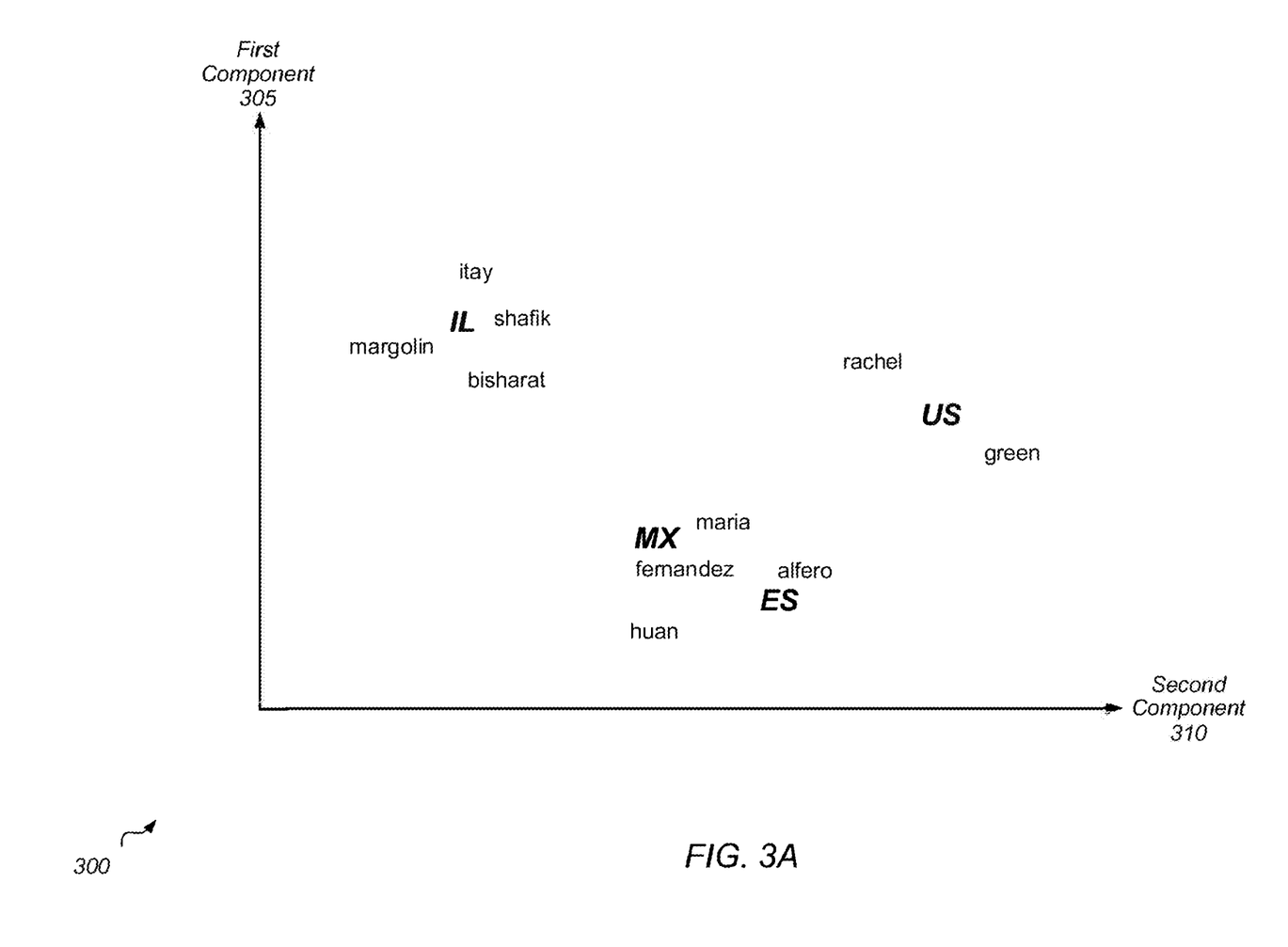
FIG. 3A illustrates a representation of a vector space resulting from training a machine learning classifier, such as a word2vec based classifier, according to some embodiments

Turning to FIG. 3A, a diagram 300 is shown of a representation of a vector space resulting from training a machine learning classifier (such as a word2vec based classifier), according to some embodiments. In this figure, a first component 305 and a second component 310 are shown on the graph axes. Note that in some instances, three or more dimensions may occur as part of the vector space.

The country codes for Israel (IL), Mexico (MX), Spain (ES) and the United States (US) are shown in bold text. Surrounding these codes are various name components. The location of the name components are where those names map in the vector space. So it can be seen that "shafik" maps to a location close to the Israel country code, while "rachel" maps near the United States. This example is a simplified version used for purposes of illustration; a real-life example would have hundreds, thousands, or more different name portions that map to portions of vector space near dozens or even hundreds of countries, according to various embodiments.

Figure 3B:
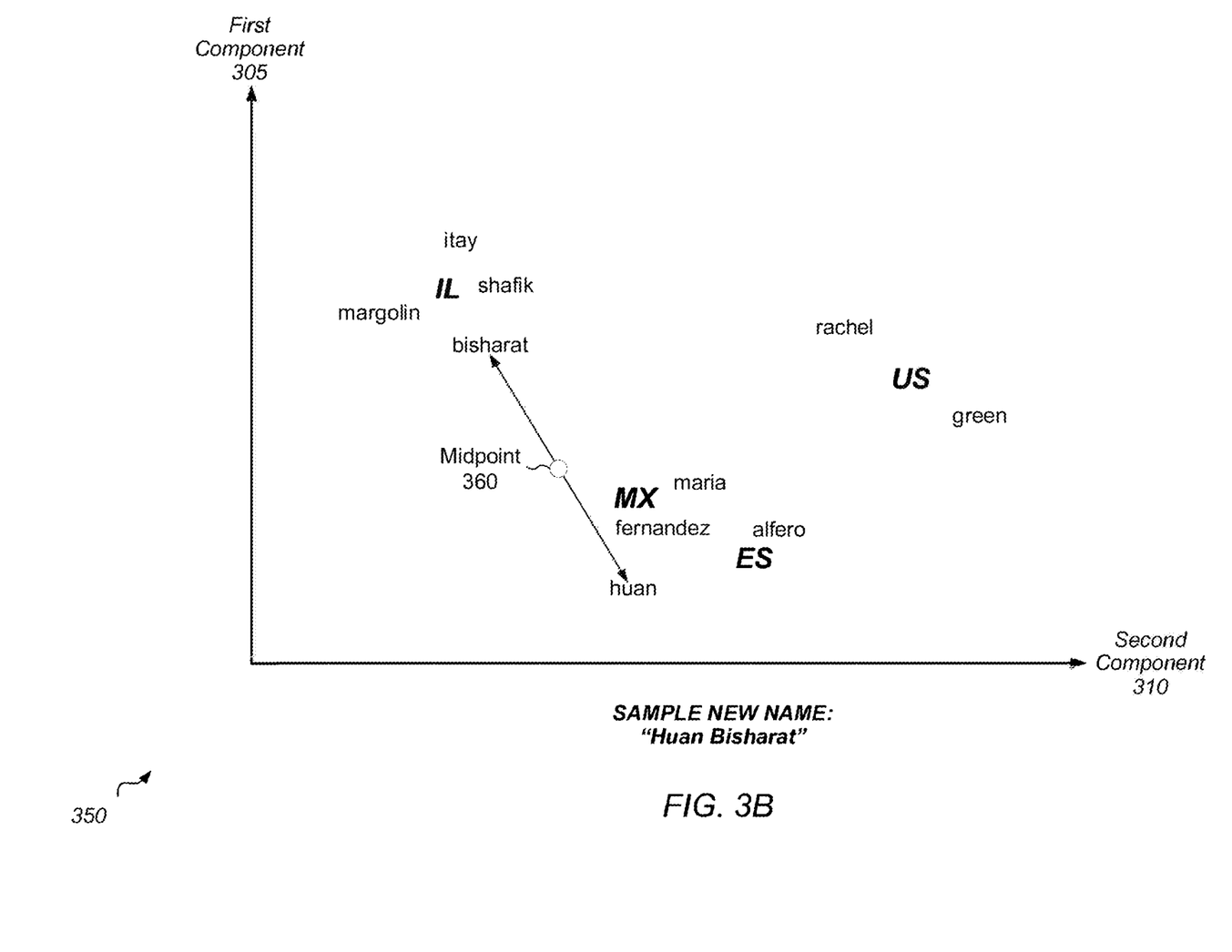
FIG. 3B illustrates an example diagram relating to the association of an unknown name to a particular country code, according to some embodiments.

In FIG. 3B, an example is shown using a diagram 350 how an unknown name can be associated with a particular country code, according to some embodiments. In this example, a trained classifier is trying to find a country code for the name "Huan Bisharat." This particular name has not been seen before—but the first name "Huan" has been seen, as has the last name "Bisharat". In this case, AI system 170 can create an average between a vector for the name portion "huan" and another vector for the name portion "bisharat". This average vector is depicted at midpoint 360 on the diagram.

Using midpoint 360, a country code can then be determined. The closest country code to midpoint 360 is MX for Mexico; Spain (ES) is further away while Israel (IL) is yet further away still. Stated in other terms, the cosine similarity for MX is closest to the vector indicated by midpoint 360 than the cosine similarity of that vector to any other country code in the vector space.

Figure 4:
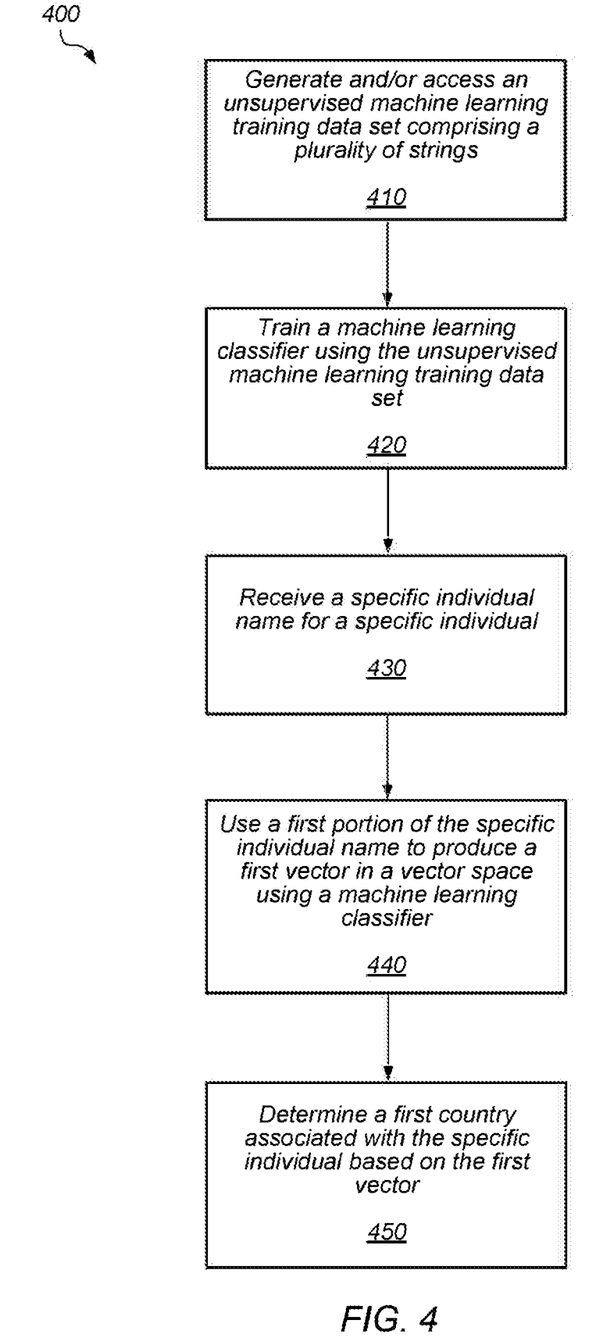
FIG. 4 illustrates a flowchart of a method relating to relating to using unsupervised machine learning to determine a country associated with a specific individual based on that individual's name, according to some embodiments.

Turning to FIG. 4, a flowchart of a method 400 relating to using unsupervised machine learning to determine a country associated with a specific individual based on that individual's name, according to some embodiments.

Operations described relative to FIG. 4 may be performed, in various embodiments, by any suitable computer system and/or combination of computer systems, including AI system 170. For convenience and ease of explanation, operations described below will simply be discussed relative to AI system 170 rather than any other system, however. Further, various operations and elements of operations discussed below may be modified, omitted, and/or used in a different manner or different order than that indicated. Thus, in some embodiments, AI system 170 may perform one or more operations while another system might perform one or more other operations.

The term "country" is used in many examples below to illustrate how a person's name can be used as a basis for associating that person with a particular country. As explained above, the techniques of this disclosure can be generalized and used in other scenarios as well in which noisy data may make unsupervised machine learning techniques useful in associating something with a user's name (or another identifier).

In operation 410, AI system 170 generates and/or accesses an unsupervised machine learning training data set comprising a plurality of strings, according to various embodiments. This unsupervised machine learning training data set can be generated by adding a plurality of country identifiers to at least a portion of a plurality of names corresponding to a respective plurality of individual persons.

Operation 410 can therefore include creating a data set that is later used in an unsupervised machine learning process. In supervised machine learning, data is typically labeled. E.g., a picture contains a human face or does not contain a human face; or a person is labeled as being associated with one or more particular countries; or an electronic payment transaction is either fraudulent or legitimate (not fraudulent).

The data is not explicitly labeled in the unsupervised machine learning training data set of operation 410, however. Instead, a group of names can be combined with country codes (or another country/region identifier) in a way that allows the names to be associated with the country identifiers through unsupervised machine learning processes.

The unsupervised machine learning training data set can be created by appending a country code (country identifier) to a list of names. For example, certain names may already have a known association with a particular country (as in the examples of FIGS. 2A-3B). The country codes can be added to the end of the names, so that the training data set consists of entries such as "itay margolin IL" and "rachel green US". Different methods of constructing the training data can be used, of course. For example, the country code could be prepended instead ("IL itay margolin") or inserted elsewhere in the name ("rachel US green"), if desired. Multiple strings could even be created from the name and country code data (e.g. there could be three different entries for Rachel Green if desired: "rachel green US", "rachel US", and "green US").

Generating the unsupervised machine learning training data set can include standardizing a plurality of names corresponding to a respective plurality of individual persons. This standardization can include converting the plurality of names to a same capitalization (e.g., all lowercase, or all uppercase). Standardization can also include replacing at least one type of punctuation character with whitespace or deleting one type of punctuation character. The name "James O'Neil" could be standardized as "james oneil", for example. Whitespace, punctuation, and/or certain character sequences can also be deleted for standardization; for example, "Francis de la Roche" could be standardized as "francis roche" or "francis delaroche", in various embodiments.

Note that in some embodiments, it is desirable to convert the names to all lowercase, while leaving the country country code added to the name in uppercase. This can avoid confusion with name portions that might cause incorrect associations. If "Francis de la Roche" was made uppercase and had the country code for Germany added, then the resulting string would be "FRANCIS DE LA ROCHE DE" which could cause undesirable results.

In operation 420, AI system 170 trains a machine learning classifier using the unsupervised machine learning training data set, according to various embodiments. This training processes may associate individual ones of a plurality of names to individual ones of a plurality of country identifiers within a vector space.

Operation 420 thus can include using a word2vec based algorithm with a corpus of text that includes names that have had country codes added to them (as produced by operation 410). As a result of the training, a vector space can be produced where each full name and/or name component (portion of a name) is associated with a particular location/vector. E.g., the country code "US" might have a two-dimensional vector location of [−50, 12.2], while the name components "rachel" and "green" might respectively have vectors of [−47.1, 10.5] and [−48, 11]. These vectors are created during the training process.

In operation 430, AI system 170 receives a specific individual name for a specific individual, according to various embodiments. This name can be for an "unknown" person who is not known to be associated with a particular country or region. For example, a new user on the Xoom™ service may not have any association with a specific country, and it would be helpful if AI system 170 could determine a country of interest for that new user. If a country of interest is known (e.g. a place where the user has family members to whom she might want to send money), customized content can be created for the user based on the country. This customized content can encourage the user to use the Xoom™ service.

In operation 440, AI system 170 uses a first portion of the specific individual name to produce a first vector in a vector space using a machine learning classifier, according to various embodiments. The first portion of the name can be just a first name ("Huan"), just a last name ("Alfero"), the entire name ("Huan Alfero"), or some other portion (just a middle name, or even just some letters (e.g. "fero").

The first vector produced may be indicative of a particular location within the vector space that resulted from training the classifier. This vector can then be used to determine a country believed to be associated with an individual.

Additional vectors can also be used. A second vector, using a second portion of the specific individual name, can also be produced in the vector space using a trained machine learning classifier (e.g. a classifier trained using a word2vec algorithm). Third vectors or additional vectors can similarly be created. Vectors created for classification of an unknown individual can be standardized in a same manner as was used to create the unsupervised machine learning data set (e.g. punctuation, whitespace, and/or other character sequences can be deleted and/or concatenated as desired). Thus, "Juan del Toro" could become "juan del toro", "juan deltoro", or "juan toro", according to various embodiments.

In operation 450, AI system 170 determines a first country associated with the specific individual based on the first vector, according to various embodiments. The can be done by comparing respective cosine similarities between the first vector and country vectors for a plurality of countries. If the first vector is based on the name "Alexander Hamilton", then the cosine similarity of that vector can be compared to cosine similarities for different countries such as India, Israel, United States, Mexico, etc. The largest similarity can then be used to associate a particular country with a particular individual. A threshold level may have to be met in some cases. If the cosine similarity range is from 0.0 to 1.0, it may be the case that a similarity of 0.7 (or some other level) is required in order to associate a country with an individual. In some instances, two or more countries can also be associated with an individual—for example, if "United States" and "Mexico" both have cosine similarities of 0.89 and 0.87 respectively, then both of those countries could be associated to an individual, in some embodiments. (In such cases, customized content based on one or both of those countries could be created.) Associating a country with an individual can include editing a data record for the individual in a database to include a new country code, or otherwise editing a data structure such that the country code can be located based on an identifier for the individual.

Determining a country for an individual can of course be based on multiple vectors as well. If a name has a first name, middle name, and last name, for example, then three different vectors could be created using the classifier. These vectors could then be averaged to create an average name vector. The average name vector can then have a cosine similarity check performed on it relative to a list of countries to see which country the average name vector is closest to in the vector space. Note that weighted averages could also be used if desired to create the average name vector (e.g. last name vector could be weighted as 0.4, first name vector weighted as 0.35, and middle name vector weighted as 0.25, as just one example).

In some cases, a portion of a name cannot be used to determine a country identifier for a person. This may be the case when a portion of the name is unique (i.e. does not appear in a training data set) or if a portion of the name does not appear within the training data set at a sufficient threshold level (e.g. three or more appearances, at least 0.005% of all name portions, or some other level). The name "Harold Uniquename Smith" might be treated as "harold smith" for example, in the event that "Uniquename" is a name portion that does not appear in the training data. Accordingly, method 400 can include determining, for a second portion of a specific individual name, that a second vector cannot be produced in the vector space using the machine learning classifier. In such a case, determining the first country associated with the specific individual may not be based on that second portion of the specific individual name. Instead, an average vector might be constructed from "harold" and "smith".

Customized digital content can also be created by AI system 170 (or another system) for a specific individual based on a determination of country made using a machine learning classifier. For example, a particular email, SMS text message, physical mailer, or other content could be created that has one or more references to the associated country in it. Various content is possible. This content can then be transmitted to the specific individual.

Computer-Readable Medium

Figure 5:
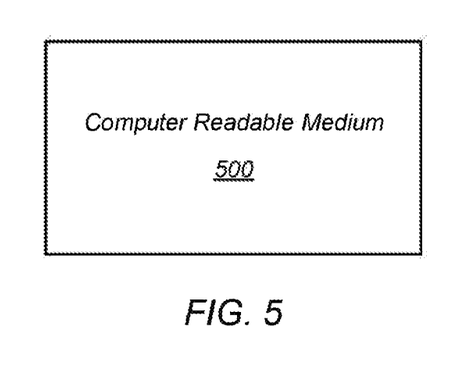
FIG. 5 is a diagram of a computer readable medium, according to some embodiments.

Turning to FIG. 5 a block diagram of one embodiment of a computer-readable medium 500 is shown. This computer-readable medium may store instructions corresponding to the operations of FIG. 4 and/or any techniques described herein. Thus, in one embodiment, instructions corresponding to AI system 170 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 6:
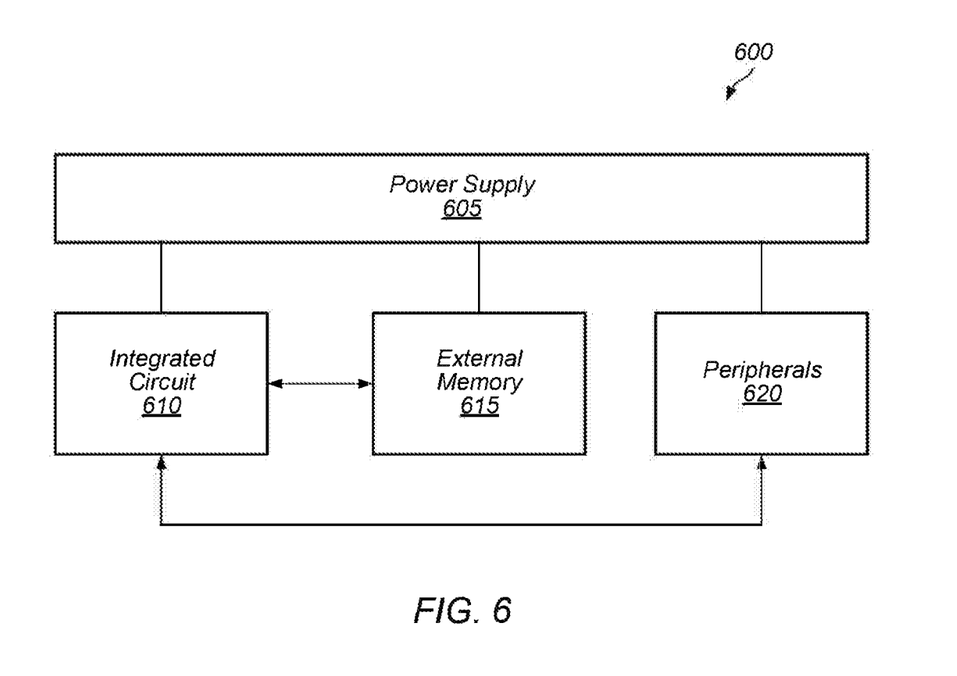
FIG. 6 is a block diagram of a system, according to some embodiments.

In FIG. 6, one embodiment of a computer system 600 is illustrated. Various embodiments of this system may be included in front end server 120, backend server 160, AI system 170, or any other computer system.

In the illustrated embodiment, system 500 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as Wi-fi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices. By way of further explanation, in some embodiments system 600 may include multiple computers or computing nodes that are configured to communicate together (e.g. computing cluster, server pool, cloud computing system, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method relating to using unsupervised machine learning to determine a country association based on a name, comprising:
   accessing an unsupervised machine learning training data set comprising a plurality of strings generated by adding a plurality of country identifiers to a plurality of names corresponding to a respective plurality of individual persons;
   training a machine learning classifier using the unsupervised machine learning training data set, wherein the training comprises generating, for each country identifier in the plurality of country identifiers, a country vector in a vector space and associating individual name components in each of the plurality of names to individual ones of the plurality of country identifiers within the vector space based on the plurality of strings;
   receiving, by a computer system, a specific individual name of a specific individual;
   producing, by the computer system and for a first name component in the specific individual name, a first vector in the vector space using the machine learning classifier;
   producing, by the computer system and for a second name component in the specific individual name, a second vector in the vector space using the machine learning classifier;
   determining a combined vector in the vector space based on the first and second vectors; and
   based on the combined vector, determining, by the computer system from a plurality of countries corresponding to the plurality of country identifiers, a first country associated with the specific individual.

2. The method of claim 1, wherein the combined vector is determined by averaging the first vector with the second vector.

3. The method of claim 1, wherein the specific individual name further comprises a third name component, wherein the method further comprises:
   determining that the machine learning classifier is unable to produce a third vector based on the third name component of the specific individual name, wherein the combined vector is determined without consideration of the third name component of the specific individual name.

4. The method of claim 3, wherein the determining that the machine learning classifier is unable to produce the third vector comprises determining that the third name component of the specific individual name is excluded from the unsupervised machine learning training data set.

5. The method of claim 1, further comprising:
   standardizing the plurality of names corresponding to the respective plurality of individual persons, wherein the standardizing comprises converting characters in the plurality of names to a same capitalization, and wherein the unsupervised machine learning training data set is generated based on the standardized plurality of names.

6. The method of claim 1, further comprising:
   comparing respective cosine similarities between the first vector and a plurality of country vectors generated for the plurality of country identifiers, wherein the first country is determined to be associated with the specific individual further based on determining that a first cosine similarity between the first vector and a first country vector generated for a first country identifier is larger than other cosine similarities.

7. The method of claim 1, wherein the adding the plurality of country identifiers to the plurality of names comprises, for each respective full name of the plurality of names, appending a corresponding country identifier to the respective full name.

8. The method of claim 1, wherein the training the machine learning classifier using the unsupervised machine learning training data set comprises applying a word2vec algorithm to the plurality of strings.

9. The method of claim 1, further comprising standardizing a format of the specific individual name prior to producing the first vector, wherein the standardizing comprises replacing at least one type of punctuation character with a whitespace.

10. The method of claim 1, further comprising standardizing a format of the specific individual name prior to producing the first vector, wherein the standardizing comprises deleting at least one type of punctuation character.

11. The method of claim 1, further comprising:
    customizing digital content for the specific individual based on the first country; and
    causing the customized digital content to be transmitted to the specific individual.

12. The method of claim 1, wherein the first name component of the specific individual name is a last name of the specific individual.

13. A non-transitory computer-readable medium having stored thereon instructions that when executed by a computer system cause the computer system to perform operations comprising:
    generating an unsupervised machine learning training data set comprising a plurality of strings by adding a plurality of country identifiers to a plurality of names corresponding to a respective plurality of individual persons;
    training a machine learning classifier using the unsupervised machine learning training data set, wherein the training comprises generating, for each country identifier in the plurality of country identifiers, a country vector in a vector space and associating individual name components in the plurality of names to individual ones of the plurality of country identifiers within the vector space based on the plurality of strings;
    receiving a specific individual name of a specific individual;
    producing, for a first name component of the specific individual name, a first vector in the vector space using the machine learning classifier;
    producing, for a second name component of the specific individual name, a second vector in the vector space using the machine learning classifier;
    producing an average name vector in the vector space based on the first vector and the second vector; and
    determining, from a plurality of countries corresponding to the plurality of country identifiers, a first country associated with the specific individual.

14. The non-transitory computer-readable medium of claim 13, wherein the generating the unsupervised machine learning training data set comprises standardizing the plurality of names, wherein the standardizing comprises converting characters in the plurality of names to a same capitalization.

15. The non-transitory computer-readable medium of claim 13, wherein the determining the first country includes determining whether a cosine similarity between the average name vector and a first country vector generated for a first country identifier corresponding to the first country exceeds a threshold value.

16. The non-transitory computer-readable medium of claim 13, wherein the operations further comprise:
customizing content for the specific individual based on the first country; and
causing the customized content to be transmitted to the specific individual.

17. A system, comprising:
one or more hardware processors; and
a non-transitory computer-readable medium having stored thereon instructions that when executed cause the system to perform operations comprising:
generating an unsupervised machine learning training data set comprising a plurality of strings by adding a plurality of country identifiers to a plurality of names corresponding to a respective plurality of individual persons;
training a machine learning classifier using an unsupervised machine learning training data set, wherein the training comprises generating, for each country identifier in the plurality of country identifiers, a country vector in a vector space and associating individual name components in the plurality of names to individual ones of the plurality of country identifiers within the vector space;
producing, for a first name component of a specific individual name of a specific individual, a first vector in the vector space using the machine learning classifier;
producing, for a second name component of the specific individual name, a second vector in the vector space using the machine learning classifier;
determining a combined vector in the vector space based on the first and second vectors; and
based on the combined vector, determining, from a plurality of countries corresponding to the plurality of country identifiers, a first country associated with the specific individual.

18. The system of claim 17, wherein the combined vector is determined by averaging the first vector with the second vector.

19. The system of claim 17, wherein the specific individual name further comprises a third name component, and wherein the operations further comprise:
determining that the machine learning classifier is unable to produce a third vector for the third name component, wherein the combined vector is determined without consideration of the third name component of the specific individual name.

20. The system of claim 17, wherein the operations further comprise:
comparing respective cosine similarities between the first vector and a plurality of country vectors generated for the plurality of country identifiers, wherein the first country is determined to be associated with the specific individual further based on determining that a first cosine similarity between the first vector and a first country vector generated for a first country identifier is larger than other cosine similarities.

* * * * *